(12) United States Patent
Le Nevé et al.

(10) Patent No.: US 11,191,214 B2
(45) Date of Patent: Dec. 7, 2021

(54) SYSTEM FOR ASSOCIATING TWO ELEMENTS BY THEIR ADJACENT FLEXIBLE WALLS

(71) Applicant: CNH Industrial America LLC, New Holland, PA (US)

(72) Inventors: Daniel H. A. M. Le Nevé, Challans (FR); Emmanuel Guerineau, Beaulieu-sous-la-Roche (FR)

(73) Assignee: CNH Industrial America LLC, New Holland, PA (US)

( * ) Notice: Subject to any disclaimer, the term of this patent is extended or adjusted under 35 U.S.C. 154(b) by 382 days.

(21) Appl. No.: 16/321,461

(22) PCT Filed: Jul. 27, 2017

(86) PCT No.: PCT/EP2017/068946
§ 371 (c)(1),
(2) Date: Jan. 28, 2019

(87) PCT Pub. No.: WO2018/019916
PCT Pub. Date: Feb. 1, 2018

(65) Prior Publication Data
US 2019/0174676 A1    Jun. 13, 2019

(30) Foreign Application Priority Data
Jul. 28, 2016 (EP) .................................... 16305981

(51) Int. Cl.
*A01D 46/28* (2006.01)
*B65D 21/02* (2006.01)

(52) U.S. Cl.
CPC .......... *A01D 46/28* (2013.01); *B65D 21/0201* (2013.01)

(58) Field of Classification Search
CPC .. A01D 46/28; B65D 21/0201; B65G 17/126; B65G 17/04; Y10T 24/28;
(Continued)

(56) References Cited

U.S. PATENT DOCUMENTS 3,050,578 A * 8/1962 Huebner ............... F16L 3/2235
174/40 CC
3,795,305 A    3/1974 Sandvik
(Continued)

FOREIGN PATENT DOCUMENTS

FR    2399793 A1    3/1979

OTHER PUBLICATIONS

European Search Report for PCT/EP2017/068946 dated Oct. 10, 2017 (11 pages).

*Primary Examiner* — Alicia Torres
*Assistant Examiner* — Matthew Ian Neal
(74) *Attorney, Agent, or Firm* — Peter Zacharias; Patrick Sheldrake

(57) ABSTRACT

A system for associating two elements by their adjacent flexible walls including two orifices formed in each wall to be aligned two by two. A pair of tabs arranged next to the aligned orifices engage through orifices in a position wherein said walls are plated between the tabs. The couplings include a pin provided on a tab and a hole provided on the other tab to be disposed respectively through and next to the orifices when said tabs are arranged on either side of the juxtaposed walls. The pin of a tab is irreversibly coupled within a hole of another tab.

17 Claims, 5 Drawing Sheets

(58) Field of Classification Search
CPC ............ Y10T 24/3431; Y10T 24/3445; Y10T 24/344; Y10T 24/44026; Y10T 24/3467; Y10T 24/3499; Y10T 24/4509; F16B 21/086; F16B 7/22; F16B 12/16; F16B 13/0833; F16B 5/121; F16B 2/08; F16B 5/06
USPC ................................ 56/328.1; 198/714, 715
See application file for complete search history.

(56) References Cited

U.S. PATENT DOCUMENTS

| | | | | |
|---|---|---|---|---|
| 4,175,880 A | * | 11/1979 | Muller | B42B 5/08 |
| | | | | 402/48 |
| 4,204,389 A | * | 5/1980 | Delfosse | A01D 46/28 |
| | | | | 56/329 |
| 6,047,447 A | * | 4/2000 | Ueno | G09F 3/037 |
| | | | | 24/16 PB |
| 6,267,226 B1 | * | 7/2001 | Jarmain | B65G 17/126 |
| | | | | 198/701 |
| 6,287,064 B1 | * | 9/2001 | Jhumra | F16B 37/043 |
| | | | | 411/112 |
| 8,316,514 B2 | * | 11/2012 | Sano | B60R 13/0206 |
| | | | | 24/297 |
| 2004/0050030 A1 | * | 3/2004 | Merant | A01D 46/28 |
| | | | | 56/340.1 |
| 2009/0313792 A1 | * | 12/2009 | Racoillet | F16L 33/035 |
| | | | | 24/20 R |
| 2010/0139233 A1 | | 6/2010 | Terbeek | |

* cited by examiner

SYSTEM FOR ASSOCIATING TWO ELEMENTS BY THEIR ADJACENT FLEXIBLE WALLS

TECHNICAL FIELD

The invention concerns a system for associating two elements by their adjacent flexible walls, a conveyor comprising an elongated traction member and a row of buckets the adjacent flexible transverse walls thereof being associated to one another by means of a least one of such a system, as well as a harvesting machine comprising a harvest recovery unit which comprises at least one of such a conveyor.

The invention applies in particular to the technical domain of mechanical harvesting of fruits growing on plants, such as trees or bushes, that are arranged in rows, such as grapes, berries, coffee beans, olives etc., and in particular fruits growing in bunches.

BACKGROUND OF ART

Fruits are conventionally harvested by a harvesting machine comprising a motorised support structure which is movable along rows of plants, a harvesting unit being mounted on said structure for straddling at least one of said rows of plants and harvesting fruits from said row. To that end, the harvesting unit includes a straddling chassis which delimits a harvesting tunnel into which the plants are successively introduced to move through said tunnel between respective openings at the front and at the rear of said tunnel.

To detach the fruit from the plants, the harvesting unit includes a shaker system including two shaker devices, said shaker devices being arranged on respective sides of the harvesting tunnel to delimit said tunnel transversely.

The harvesting machine further includes a recovery unit for conveying the flow of harvest obtained, which enables, possibly after cleaning and/or sorting, the storage thereof in at least one hopper provided for that purpose on the harvesting machine or in an ancillary trailer.

For example, document FR-2 399 793, such as document U.S. Pat. No. 3,603,447, describe bucket conveyors comprising an elongated traction member and a plurality of recovery buckets that are arranged in a row on said traction member for forming a recovery belt on said traction member, each bucket comprising a body made from a flexible material, especially a flexible polymeric material, with a pair of opposite walls extending transverse to the moving direction of the traction member.

In particular, the buckets may be made from polyurethane, so as to ensure soft contact on the plants and the maximum sealing of the recovery belt for receiving all the detached harvest without ground losses.

To that end, each bucket may be associated to adjacent buckets in the row, in particular by their adjacent flexible transverse walls. In particular, associating systems are known, comprising:
said two walls and at least two orifices formed in each of the walls to be aligned two by two when said walls are in a juxtaposed position;
a pair of tabs being operable to be arranged next to the aligned orifices respectively on one side of juxtaposed walls;
mutual coupling means for coupling said tabs, said mutual coupling means being adapted to be engaged through said aligned orifices in a position wherein said walls are plated between said tabs.

Thus, by tightly plating adjacent transverse walls to one another between the tabs, it is possible to prevent any clearance between buckets in the recovery belt, and then to prevent the risks of loss of harvest products through such clearances.

The tabs are conventionally made of relatively rigid material, such as stainless steel, and are fixed to one another and to the flexible walls by rigid rivets, which can also be made of stainless steel, in particular for preventing the risks of rust.

However, such systems are not totally satisfactory, as the installation of the rivets is relatively complicated and fastidious to perform, especially as the conveyors generally comprise a great number of buckets.

Moreover, the association of the tabs by the rivets is too strong so that, if a bucket is hung on a fixed element, such as a pole or an iron wire, during the harvesting, said bucket may be torn apart from its adjacent buckets, which may cause tearing damages on said bucket and/or on said adjacent buckets, and then may alter the sealing of the recovery belt. Thus, a replacement of the damaged bucket(s) will be necessary, which is relatively complicated and fastidious to perform.

Moreover, during such a tearing off, the tabs may irreversibly deform, which may cause damages to the conveyor and/or to the harvesting machine, due to potential hits between deformed tabs in movement and other fixe structures of said conveyor and/or said machine.

The invention aims to improve the prior art by proposing a system which allows not only for associating adjacent buckets in a simple and quick manner, but also for preventing any damage on said buckets in the case of a tearing off of said buckets from one another.

SUMMARY OF INVENTION

For that purpose, and according to a first aspect, the invention relates to a system for associating two elements by their adjacent flexible walls, said system comprising:
said two walls and at least two orifices formed in each of said walls to be aligned two by two when said walls are in a juxtaposed position;
a pair of tabs being operable to be arranged next to the aligned orifices respectively on one side of juxtaposed walls;
mutual coupling means for coupling said tabs, said mutual coupling means being adapted to be engaged through said aligned orifices in a position wherein said walls are plated between said tabs;
the mutual coupling means comprising a pin provided on one tab and a hole provided on the other tab, the pin and the hole being operable to be disposed respectively through and next to the aligned orifices when said tabs are arranged on either side of the juxtaposed walls, a pin of a tab being arranged to be irreversibly coupled within a hole of another tab in a position wherein said walls are plated between said tabs.

According to a second aspect, the invention relates to a conveyor comprising an elongated traction member and a plurality of buckets that are arranged in a row on said traction member for forming a recovery belt on said traction member, each bucket comprising a flexible body with a pair of opposite walls extending transversely to the moving direction of the traction member, the buckets being associated to one another by means of at least one of such a system for ensuring the sealing of the recovery belt.

According to a third aspect, the invention relates to a harvesting machine comprising a motorised support structure which is movable along rows of plants, said structure comprising a harvesting unit for detaching fruits from said plants and a recovery unit for recovering the detached harvest, said recovery unit comprising at least one of such a conveyor.

BRIEF DESCRIPTION OF DRAWINGS

Other aspects and advantages of the invention will become apparent in the following description made with reference to the appended figures, wherein.

BEST MODE OF CARRYING OUT THE INVENTION

Figure 1:
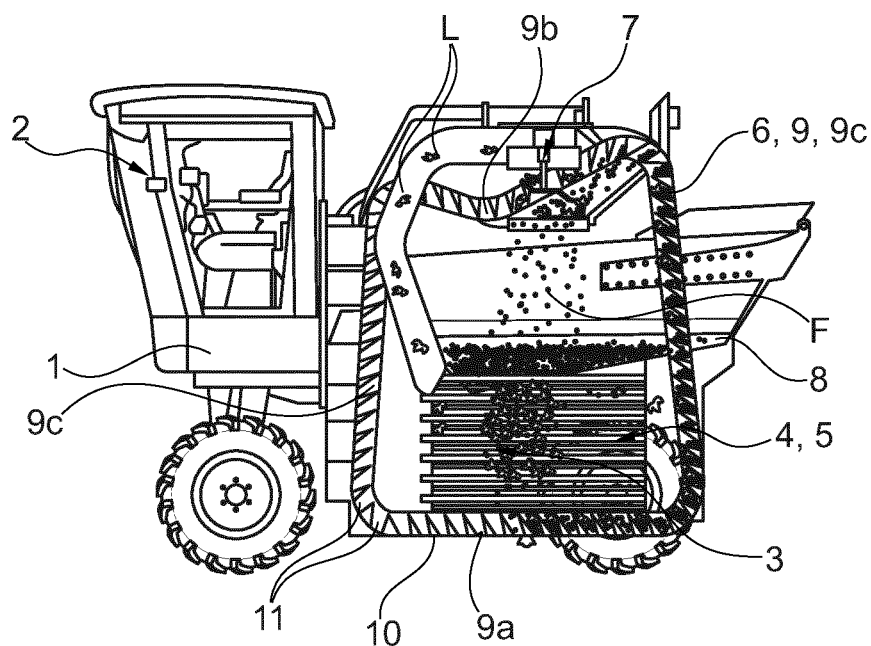
FIG. 1 represents in a side view a harvesting machine according to the invention, with a partial cross-section showing the recovery unit.

In relation to those figures, we describe below a harvesting machine comprising a harvest recovery unit which comprises at least one conveyor comprising an elongated traction member and a row of buckets associated to one another by means of a least one system for associating two elements by their adjacent flexible walls.

The harvesting machine is in particular arranged for the mechanical harvesting of fruits growing on plants, such as trees or bushes, that are arranged in rows, such as grapes, berries, coffee beans, olives etc., and in particular fruits growing in bunches.

To do so, the harvesting machine comprises a motorized support structure 1 that is equipped with a driver station 2 and that is movable along rows of plants 3, a harvesting unit 4 being mounted on said structure for straddling at least one of said rows of plants and detaching fruits F from said plants.

In particular, the harvesting unit 4 can be mounted on the support structure 1 permanently or removably, so as to be replaceable by other equipment and accessories, for example spraying equipment, pruning equipment or equipment for working the soil.

The harvesting unit 4 includes a straddling chassis which delimits a harvesting tunnel into which the plants 3 are successively introduced to move through said tunnel between respective openings at the front and at the rear of said tunnel. Moreover, the harvesting unit 4 includes a shaker system including two shaker devices 5, said shaker devices being arranged on respective sides of the harvesting tunnel to delimit said tunnel transversely.

The harvesting machine also includes a recovery unit 6 for recovering the harvest detached by the harvesting unit 4 and a unit 7 for cleaning and/or sorting said detached harvest to eliminate components L other than fruits F, in particular leaves, leaf stalks and wood particles, before the storage of said harvest in at least one hopper 8 provided for that purpose on the harvesting machine or in an ancillary trailer.

In relation to FIG. 1, the recovery unit 6 comprises two bucket conveyors 9 that are arranged on respective sides of the harvesting tunnel, said conveyors being adapted to recover the detached harvest underneath the harvesting unit 4 and to convey said harvest into the upper part of the harvesting machine, wherein a cleaning/sorting unit 7 and at least one storing hopper 8 are mounted.

In particular, each conveyor 9 forms a closed loop with a bottom run 9a arranged for recovering the detached harvest by gravity underneath the harvesting unit 4, a top run 9b for feeding the cleaning/sorting unit 7 with said detached harvest, and substantially vertical intermediate runs 9c which extends respectively between the front and rear ends of said top and bottom runs.

Each conveyor 9 comprises an elongated traction member 10, such as a chain or a belt, and a plurality of buckets 11 that are arranged in a row on said traction member for forming a continuous recovery belt on said traction member, each bucket 11 comprising a flexible body made from a flexible polymeric material, in particular based on polyurethane, so as to ensure soft contact on the plants 3.

Figure 2:
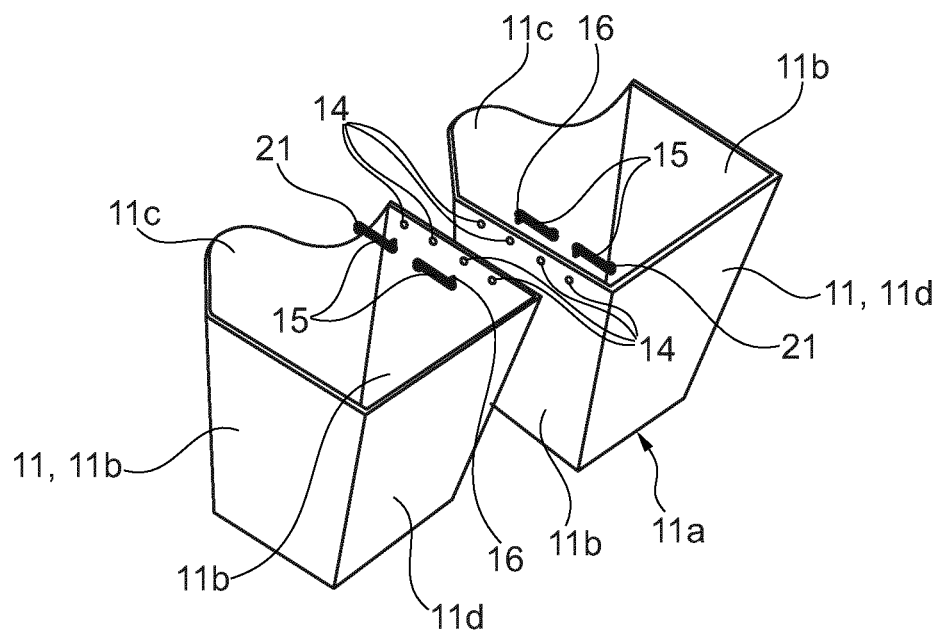
FIG. 2 represents schematically in perspective the association of two adjacent buckets of a conveyor of the recovery unit of FIG. 1 with a system according to the invention.
Figure 3:
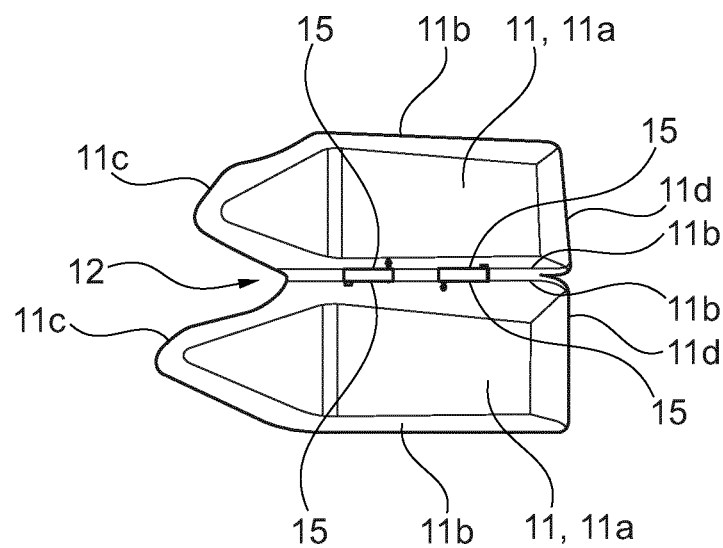
FIG. 3 represents schematically in a top view the buckets of FIG. 2 after their assembly.
Figure 4A:
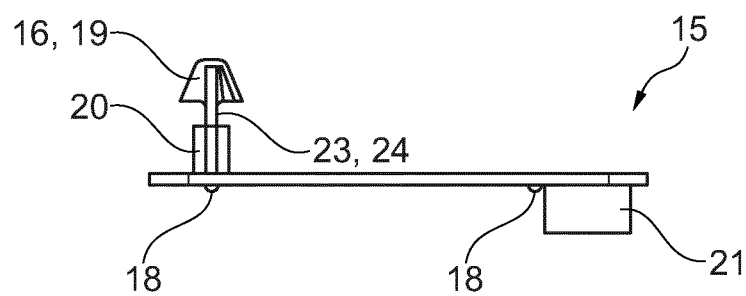
FIG. 4 represents schematically a tab of a system according to an embodiment of the invention, respectively in a side view (FIG. 4a), in a perspective top view (FIG. 4b) and in a perspective bottom view (FIG. 4c)
Figure 4B:
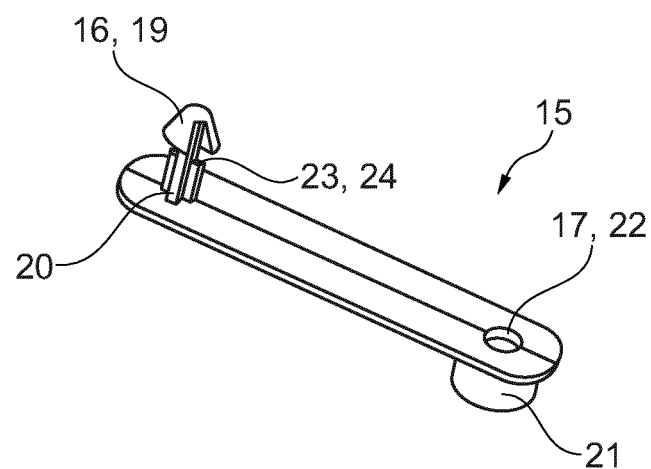
Figure 4C:
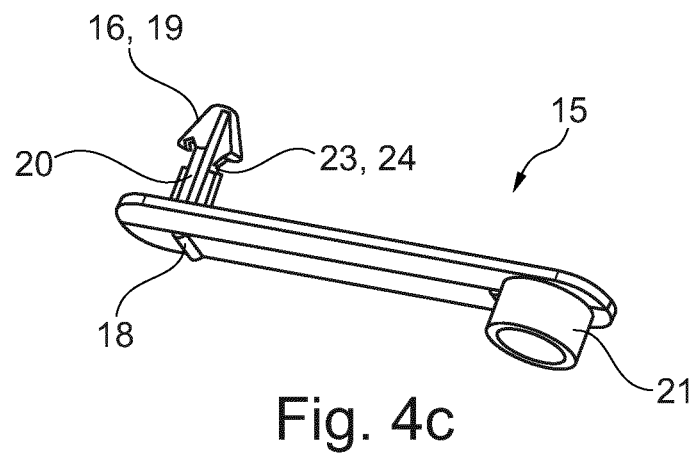
Figure 5:
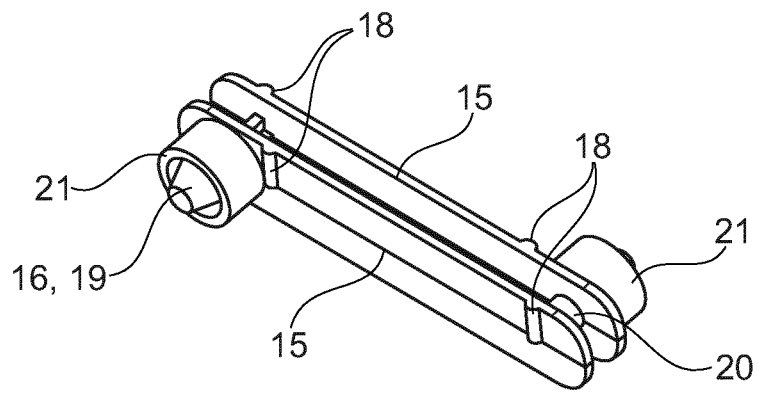
FIG. 5 represents schematically in perspective two tabs according to FIG. 4 after their irreversible coupling.

With reference to FIGS. 2 and 3, each bucket 11 comprises a bottom wall 11a which is secured to the traction member 10 (not shown), for example by means of bolts and nuts, a pair of opposite walls 11b which are intended to extend transversely to the moving direction of the traction member 10, and a pair of opposite side walls 11c, 11d which integrally connect said transverse walls at opposite sides to each other, said transverse walls and side walls being all integrally connected to the bottom wall 11a.

Advantageously, as described in document FR-2 399 793, the conveyors 9 are mounted on the support structure 1 so that their respective bottom runs 9a are adjacent to one another and guided on either side of a row of plants 3 which moves across the harvesting tunnel, so as to clamp said plants of said row at the lower portion of the stem thereof, so that the fruits F detached from said plants would fall directly by gravity into the bottom runs 9a.

Moreover, the respective buckets 11 of the conveyors 9 are arranged to form recovery belts that are arranged to imbricate into one another in at least the zone of the bottom runs 9a, so as to ensure a sealing between said conveyors at said imbrication zone. To do so, the respective buckets 11 of each conveyor 9 comprise a beak-shaped side wall 11c which is arranged facing the interior of the harvesting tunnel.

In particular, each beak-shaped side wall 11c of a conveyor 9 is intended to closely engage within a complementary space 12 formed between two adjacent beak-shaped side walls 11c of another conveyor at the zone of the bottom runs 9a for preventing any clearance between conveyors 9 at said bottom runs, and then to prevent the risk of harvest products F dropping through such clearances.

In the same way, each bucket 11 of a conveyor 9 is associated at its transverse walls 11b to flexible transverse walls 11c of adjacent buckets 11 in the row, so as to ensure a maximum sealing of the recovery belt of said conveyor for receiving all the detached harvest F without ground losses.

To that end, in relation to FIGS. 2 and 3, the invention provides for associating to one another adjacent buckets 11 of a conveyor 9 by means of at least a system comprising:

the two adjacent transverse walls 11*b* of said buckets and at least two orifices 14 formed in each of said walls to be aligned two by two when said walls are in a juxtaposed position;

a pair of tabs 15 being operable to be arranged next to the aligned orifices 14 respectively on one side of juxtaposed walls 11*b*;

mutual coupling means for coupling said tabs, said mutual coupling means being adapted to be engaged through said aligned orifices in a position wherein said walls are plated between said tabs.

The coupling means comprise a pin 16 provided on one tab 15 and a hole 17 provided on the other tab 15, the pin 16 and the hole 17 being operable to be disposed respectively through and next to the aligned orifices 14 when said tabs are arranged on either side of the juxtaposed walls 11*b*, a pin 16 of a tab 15 being arranged to be irreversibly coupled within a hole 17 of another tab 15 in a position wherein said walls are plated between said tabs.

Thus, the system allows for associating adjacent buckets 11 in a simple and relatively intuitive manner, especially without the use of specific, complex and cumbersome tools, and that in relative quick manner, in particular a few seconds.

Indeed, such a system only requires for a human operator to manually juxtapose to one another the adjacent transverse walls 11*b* to be associated, in particular by aligning together respective pairs of association orifices 14 of said walls, then to manually arrange the two tabs 15 of the system by disposing the pins 16 or holes 17 of each tab 15 in and next to respectively two aligned orifices 14, and then to couple said tabs, either with a simple tool such as a standard pair of flat pliers or even manually, by irreversibly engaging said pins within said holes by a simple pinching gesture.

In particular, each tab 15 may be made in one piece in polymeric material, in particular from polyamide, which allows not only to simplify their manufacturing and to reduce their costs, but also to comply with alimentary regulation, as said tabs may be in contact with fruits F to be harvested. To that end, the tabs 15 may be for example made from the polyamide 11, which is particularly appropriate as it is made with natural components.

Moreover, the tabs 15 both present a substantially rectangular geometry, a first 16, 17 and a second 16, 17 coupling means being formed at respective ends thereof.

According to an embodiment, represented on FIGS. 4 to 7 and 9, each tab 15 comprises at least a pin 16 and at least a hole 17, the pins 16 of each tab 15 being arranged to be irreversibly coupled within a hole 17 of each other tab 15 in a position wherein the walls 11*b* are plated between said tabs disposed head to tail.

Advantageously, the system may comprise a pair of identical tabs 15 that are both made from a same mould, which allows to reduce even more their manufacturing costs and the operation of their coupling two by two.

Figure 8A:
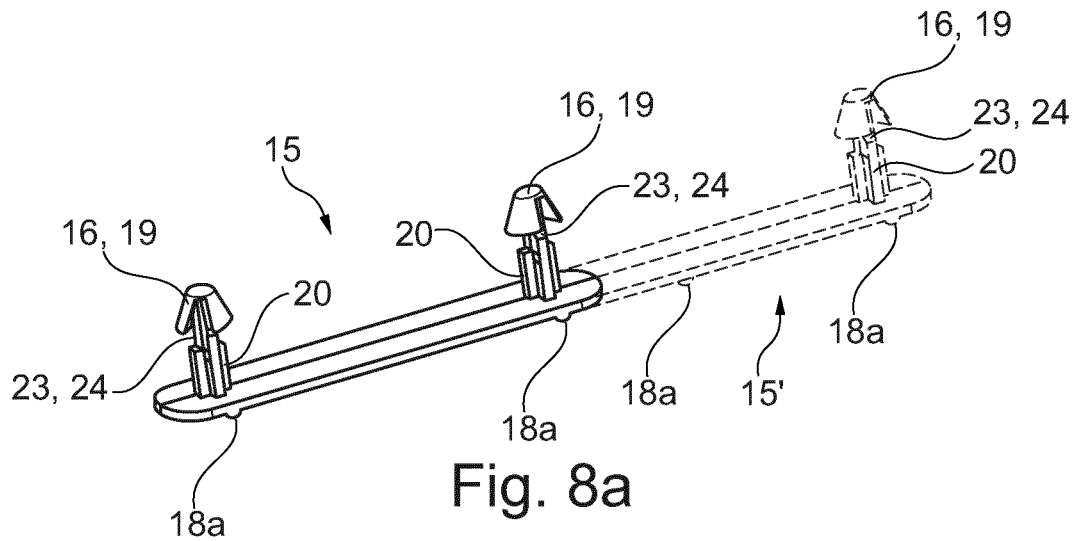
Figure 8B:
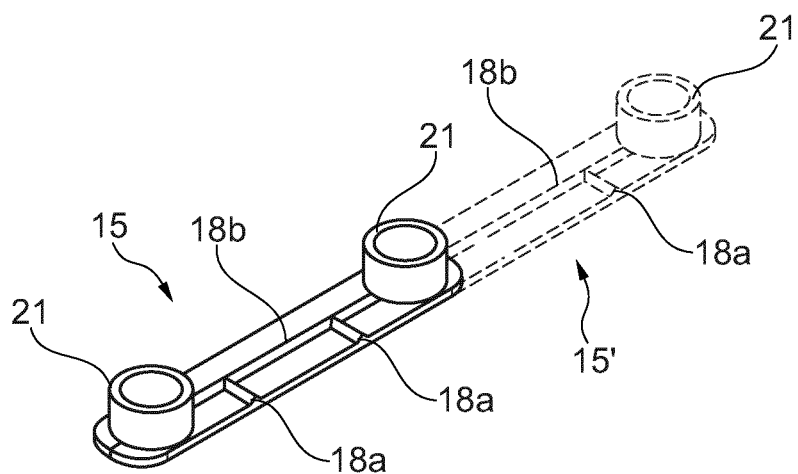

According to another embodiment, represented on FIG. 8, the system comprises a tab 15 which presents coupling means that are all formed by a pin 16 (FIG. 8*a*), whereas the other tab 15 presents coupling means that are all formed by a hole 17 (FIG. 8*b*).

As represented on FIGS. 2 and 3, the adjacent transverse walls 11*b* are associated to one another by two transversally spaced systems, which allows to improve said association, and then to improve the sealing of the recovery belt at said association.

According to a variant not represented, the adjacent transverse walls 11*b* can be associated to one another by only one system, especially in the case when the buckets 11, and thus the transverse walls 11*b* thereof, present reduced dimensions.

Figure 9A:
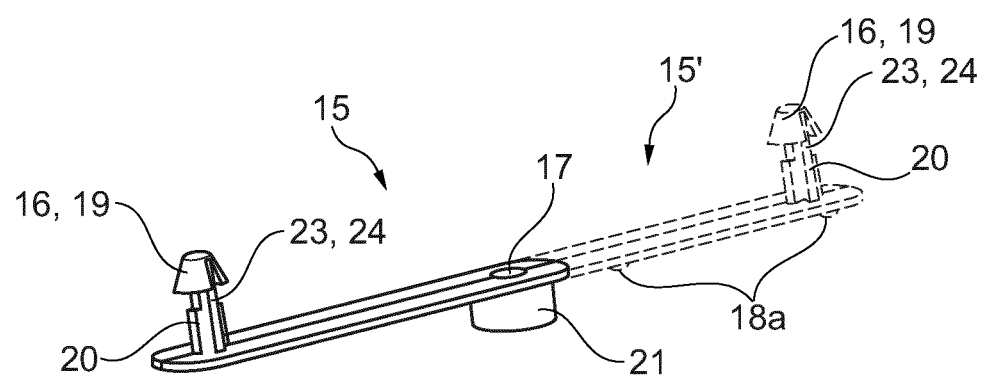
Figure 9B:
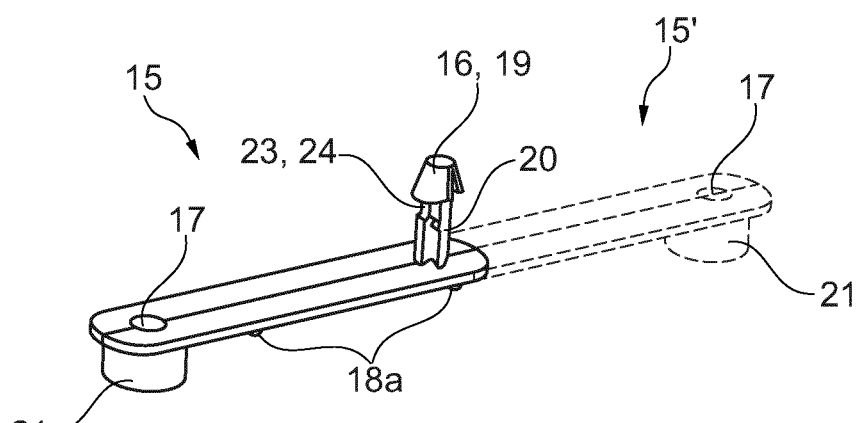

In particular, for associating such small buckets 11, the tabs 15 may comprise a length extension 15' which is provided with a third coupling means 16, 17, as indicated in dotted lines on FIGS. 8 and 9.

Figure 6:
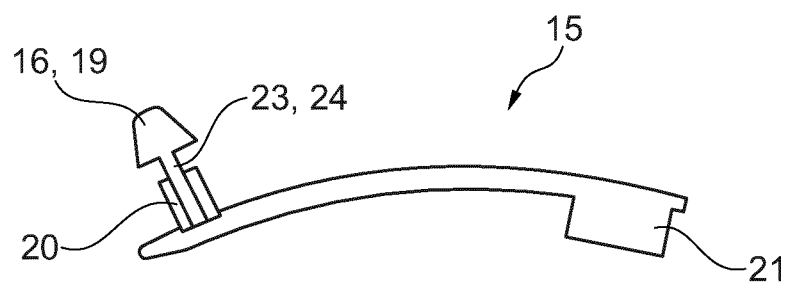
FIG. 6 represents in a side view a tab of a system according to another embodiment of the invention.
Figure 7:
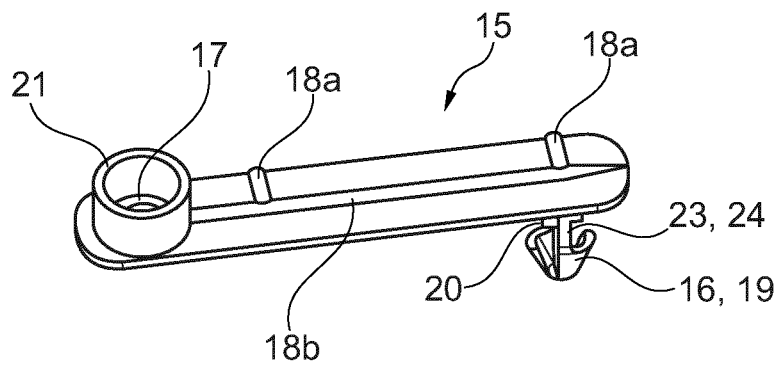
FIGS. 7 to 9 represent in perspective a tab of a system according to respective other embodiments of the invention.

Moreover, in relation to FIG. 6, the system can advantageously comprise tabs 15 that are elastically deformable between a free longitudinally-curved state and a constrained longitudinally-straight state, said tabs being intended to be arranged on either side of juxtaposed adjacent walls 11*b* with the apex of said curvatures bearing on said walls, the coupling means 16, 17 being arranged to constraint the tabs 15 in their longitudinally-straight state, in order to be able to compress the walls 11*b* between the coupled tabs 15.

Thus, the walls 11*b* can benefit from a more tightly association, which allows to prevent infiltration of polluting and sticky substances, such as dust particles and fruit juices, between said walls, and then to facilitate the cleaning of the conveyor 9 after the harvest and to prevent the risks of pollution for the next harvests.

Moreover, the tabs 15 comprises each at least one stiffening rib, notably two radial stiffening ribs 18*a* that extend next to respectively the pin 16 and the hole 17 thereof and/or a longitudinal stiffening rib 18*b* that extends between said pin and said hole.

With reference to FIGS. 4 to 9, each pin 16 comprises a head 19 linked to the tab 15 by a stem 20, said head being arranged to be snap fitted in a hole 17 to accomplish the association of the walls 11*b*. Moreover, each hole 17 is surrounded by a hollow sleeve 21 which is intended to form a housing for receiving the head 19 of the pin 16 coupled within said hole.

In particular, each head 19 comprises a flexible structure, in particular in the shape of an umbrella, which is elastically deformable between a free deployed and a constrained retracted state, each hole 17 comprising a collar 22 whereon the structure of another head 19 is at first retractable for allowing said head to pass through, and then is retained in the free deployed state upon said passage to ensure the snap fitting.

Thus, thanks to the snap fit coupling of the tabs 15, the adjacent walls 11*b* are associated to one another in a simple and secure manner, which allows to ensure the sealing of the recovery belt with a good reliability.

However, such association must not be too strong, because it may trigger tearing damages on buckets 11 if one of said buckets is hung on a fixed element, such as a pole or an iron wire, during the harvesting. Moreover, if the coupling means 16, 17 are too strong, the association tabs 15 may also irreversibly deform during a tearing off of the buckets 11 from one another, which may also cause damages to the conveyor 9 and/or to the harvesting machine, due to potential hits between deformed tabs 15 and other structures of said conveyor and/or said machine.

To avoid such drawbacks, the system may be arranged as a fuse, in particular to be breakable upon a threshold stress applied between the coupled tabs 15 thereof, so as to limit the damage risks on flexible walls 11*b* in case of a tearing off from one another.

To do so, the stems 20 of each pin 16 comprise a weakened zone 23 which is arranged to be breakable upon the occurrence of such a threshold stress, in particular a stress with an intensity comprised between 25 and 30 kg. In particular, as represented on FIGS. 4 and 6, the stems 20 comprise an area 24 of reduced section which is formed at the proximity of the head 19, said reduced section area forming the weakened zone 23.

Thus, in the case of a tearing off of two buckets 11 from one another, instead of resisting to the applied stress, will simply break at the weakened zones 23, which may cause a separation of the associated walls 11b without causing any tearing damage on them. As a matter of fact, the impact on the sealing of the recovery belt will be small, as adjacent buckets 11 are still connected to the traction member 10, and the maintenance operations to be performed after the harvest will only require a simple replacement of the broken association system(s), instead of complex, expensive and fastidious dismounting(s) of torn buckets 11.

In particular, to facilitate the replacement of broken systems, and thus to save time during the maintenance operations, the tabs 15 may display a showy contrast of colour, for example by being dark blue or black whereas the buckets 11 are more pale or white, so that a human operator may quickly and easily detect a broken or even absent system for replacing it.

The invention claimed is:

1. A system for associating two elements with walls, the system comprising:
   two walls and at least two orifices formed in each of the walls to be aligned two-by-two when the walls are in a juxtaposed position;
   a pair of tabs being operable to be arranged next to the aligned orifices respectively on one side of juxtaposed walls; and
   a mutual coupler for coupling the tabs, the mutual coupler being adapted to be engaged through the aligned orifices in a position wherein the walls are plated between the tabs, the mutual coupler comprising a pin provided on one of the tabs and a hole provided on the other of the tabs, the pin and the hole being operable to be disposed respectively through and next to the aligned orifices when the tabs are arranged on either side of the juxtaposed walls, a pin of a tab being arranged to be irreversibly coupled within a hole of another tab in a position wherein the walls are plated between the tabs, wherein each pin comprises a head linked to the tab by a stem, the head being arranged to be snap fitted in a hole to accomplish the association of the walls and wherein the stem comprises a weakened zone which is breakable by a threshold stress applied between the coupled tabs, thereby limiting the damage risks to the walls in case of the walls tearing off from one another.

2. The system according to claim 1, wherein the head comprises a flexible structure which is elastically deformable between a free deployed and a constrained retracted state, the hole comprising a collar whereon the structure is retractable for allowing the head to pass through and is retained in the free deployed state upon the passage to ensure the snap fitting.

3. The system according to claim 1, wherein the stem comprises an area of reduced section which is formed at the proximity of the head, the reduced section area forming the weakened zone.

4. The system according to claim 1, wherein the hole is surrounded by a hollow sleeve, the sleeve forming a housing for receiving the pin coupled within the hole.

5. The system according to claim 1, wherein the tabs are identical.

6. The system according to claim 1, wherein each tab comprises at least a pin and at least a hole, the pins of each tab being arranged to be irreversibly coupled within a hole of each other tab in a position wherein the walls are plated between the tabs disposed head to tail.

7. The system according to claim 1, wherein one of the tabs presents a coupler that is formed by a pin, and the other of the tabs presents a coupler that is formed by a hole.

8. The system according to claim 1, wherein the tabs present a substantially rectangular geometry, a first and a second coupler being formed at respectively an end thereof.

9. A system for associating two elements with walls, the system comprising:
   two walls and at least two orifices formed in each of the walls to be aligned two-by-two when the walls are in a juxtaposed position;
   a pair of tabs being operable to be arranged next to the aligned orifices respectively on one side of juxtaposed walls; and
   a mutual coupler for coupling the tabs, the mutual coupler being adapted to be engaged through the aligned orifices in a position wherein the walls are plated between the tabs, the mutual coupler comprising a pin provided on one of the tabs and a hole provided on the other of the tabs, the pin and the hole being operable to be disposed respectively through and next to the aligned orifices when the tabs are arranged on either side of the juxtaposed walls, a pin of a tab being arranged to be irreversibly coupled within a hole of another tab in a position wherein the walls are plated between the tabs, wherein the tabs are elastically deformable between a free longitudinally-curved state and a constrained longitudinally-straight state, the tabs being intended to be arranged on either side of juxtaposed adjacent walls with an apex of curvatures bearing on the walls, the coupler being arranged to constrain the tabs in their longitudinally-straight state thereby compressing the walls between the coupled tabs.

10. The system according to claim 1, wherein the tabs comprise at least one stiffening rib.

11. The system according to claim 1, wherein in that the tabs are made in one piece in polymeric material.

12. The system according to claim 11, wherein the tabs are made from polyamide.

13. The system according to claim 1, further comprising a conveyor having:
    an elongated traction member; and
    a plurality of buckets that are arranged in a row on the traction member for forming a recovery belt on the traction member, each of the plurality of buckets comprising a flexible body with a pair of opposite walls extending transversely to a moving direction of the traction member, wherein the buckets are associated to one another by said mutual coupler for ensuring the sealing of the recovery belt.

14. The system according to claim 13, wherein the adjacent transverse walls are associated by two transversally spaced systems.

15. The system according to claim 13, wherein each bucket is made from a flexible polymeric material.

16. The system according to claim 13, further comprising a harvesting machine having a motorised support structure which is movable along rows of plants, the structure comprising a harvesting unit for detaching fruits from the plants and a recovery unit for recovering the detached fruits, the recovery unit having at least one conveyor.

17. The system according to claim 16, comprising two conveyors, the respective buckets thereof forming recovery belts that are arranged to imbricate into one another on at least a zone, so as to ensure a sealing between the conveyors at the imbrication zone.

* * * * *